(12) United States Patent
Lu

(10) Patent No.: US 11,049,672 B2
(45) Date of Patent: Jun. 29, 2021

(54) TOUCH CONTROL DEVICE

(71) Applicants: LITE-ON ELECTRONICS (GUANGZHOU) LIMITED, Guangzhou (CN); Lite-On Technology Corporation, Taipei (TW)

(72) Inventor: Cheng-An Lu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/782,022

(22) Filed: Feb. 4, 2020

(65) Prior Publication Data

US 2020/0273641 A1 Aug. 27, 2020

Related U.S. Application Data

(60) Provisional application No. 62/808,818, filed on Feb. 21, 2019.

(30) Foreign Application Priority Data

Jul. 30, 2019 (CN) .......................... 201910692182.6

(51) Int. Cl.
 H01H 13/14 (2006.01)
 G06F 1/16 (2006.01)
 (Continued)

(52) U.S. Cl.
 CPC ............... H01H 13/14 (2013.01); G05G 1/10 (2013.01); G06F 1/169 (2013.01); G06F 1/1664 (2013.01);
 (Continued)

(58) Field of Classification Search
 CPC ...... H01H 13/14; H01H 13/807; H01H 13/52; H01H 13/705; H01H 2223/014;
 (Continued)

(56) References Cited

U.S. PATENT DOCUMENTS 6,330,991 B1 * 12/2001 Boe .......................... G06F 1/184
 248/200
2010/0073843 A1 * 3/2010 Yu ........................ H05K 9/0064
 361/220

(Continued)

*Primary Examiner* — Ahmed M Saeed
(74) *Attorney, Agent, or Firm* — JCIPRNET

(57) ABSTRACT

The present invention provides a touch control device, including a cover plate, a circuit board, an elastic sheet body and a bracket. The circuit board is fixedly arranged below the cover plate. The circuit board is provided with a triggering region located on a bottom surface. The elastic sheet body is arranged under the circuit board and corresponds to the triggering region. The bracket is disposed below the circuit board. The bracket is provided with a first side and a second side which are opposite and a middle region located on the second side and further comprises two cantilevers which are located at both sides of the middle region of the second side and extend towards opposite directions. The elastic sheet body is in contact with the middle region. The end of each cantilever is provided with an abutting-joint structure and is in contact with the circuit board by the abutting-joint structure.

19 Claims, 8 Drawing Sheets

(51) Int. Cl.
*H01H 3/12* (2006.01)
*H01H 13/705* (2006.01)
*H01H 13/83* (2006.01)
*G06F 3/041* (2006.01)
*G05G 1/10* (2006.01)
*G06F 3/0354* (2013.01)
*G06F 3/0362* (2013.01)

(52) U.S. Cl.
CPC ........ *G06F 3/0362* (2013.01); *G06F 3/03543* (2013.01); *G06F 3/041* (2013.01); *H01H 3/125* (2013.01); *H01H 13/705* (2013.01); *H01H 13/83* (2013.01); *G06F 1/1616* (2013.01); *G06F 2203/04103* (2013.01); *H01H 2217/01* (2013.01); *H01H 2219/03* (2013.01); *H01H 2219/036* (2013.01); *H01H 2221/07* (2013.01)

(58) Field of Classification Search
CPC ....... H01H 2223/026; H01H 2223/058; H01H 2025/048; H01H 13/20; H01H 13/36; H01H 2221/044; H01H 13/28; H01H 1/24; H01H 2215/028; H01H 25/041
See application file for complete search history.

(56) References Cited

U.S. PATENT DOCUMENTS

| | | | | |
|---|---|---|---|---|
| 2011/0094869 A1* | 4/2011 | Dai | ..................... | H01H 13/705 |
| | | | | 200/534 |
| 2011/0299215 A1* | 12/2011 | Chu | ..................... | H05K 9/0067 |
| | | | | 361/220 |
| 2013/0228427 A1* | 9/2013 | Sano | ................... | H01H 25/041 |
| | | | | 200/295 |

* cited by examiner

TOUCH CONTROL DEVICE

CROSS-REFERENCE TO RELATED APPLICATION

This application claims the priority benefits of U.S. provisional application Ser. No. 62/808,818, filed on Feb. 21, 2019, and China application serial no. 201910692182.6, filed on Jul. 30, 2019. The entirety of each of the above-mentioned patent applications is hereby incorporated by reference herein and made a part of this specification.

BACKGROUND OF THE INVENTION

1. Field of the Invention

The present invention relates to a touch control device and in particular relates to a touch control device capable of providing relatively good uniformity of pressing load.

2. Description of Related Art

Due to the advantages of portability and real-time information processing and transceiving, a portable electronic device such as a notebook computer, a smart phone or a tablet personal computer is widely accepted by consumers and has become the mainstream of the current electronic consumer market. Take the notebook computer as an example, in terms of controlling the position of a cursor on a display screen, the notebook computer may achieve a similar function of controlling the movement or click of the cursor on the display screen by further utilizing a touch control panel integrated on a main case.

However, a user may find the phenomenon that the pressing forces required by the touch control panel in a left side region, a right side region and a middle region which can be pressed are non-uniform in the using process of the touch control panel. Generally speaking, a common solution in the market is to newly increase connecting mechanisms in the left side region, the right side region and the middle region, such that the connecting mechanisms drive the left side region, the right side region and the middle region to move together to keep the forces at the left and right sides consistent with that of the middle region. However, the method has the disadvantage that the cost, the assembly difficulty and the like may be increased due to the new addition of the connecting mechanisms. The other solution is to increase the structural strength (such as thickness) of a pressed part of the touch control panel, but an existing notebook computer develops towards the lightening and thinning trends, and therefore, such solution cannot meet the demand for lightening and thinning design. In addition, there is a space between a bracket and a circuit board of a known touch control device, so that the known touch control device is liable to skew in an assembly process, resulting in incomplete appearance of the known touch control device.

Therefore, one of problems desired to be solved in the field is to provide the relatively good uniformity of pressing load for the touch control device without additionally increasing mechanisms or thickness and make the appearance of the touch control device complete.

SUMMARY OF THE INVENTION

The present invention is directed to a touch control device capable of providing the relatively good uniformity of pressing load.

The touch control device according to the invention comprises a cover plate, an elastic sheet body, a circuit board and a bracket. The circuit board is fixedly arranged below the cover plate. The circuit board is provided with a triggering region located on a bottom surface. The elastic sheet body is arranged under the circuit board and corresponds to the triggering region. The bracket is disposed below the circuit board. The bracket is provided with a first side and a second side which are opposite to each other and a middle region located on the second side and further comprises two cantilevers which are located at both sides of the middle region of the second side and extend towards opposite directions. The elastic sheet body is in contact with the middle region. The end of each cantilever is provided with an abutting joint structure and is in contact with the circuit board by the abutting-joint structure.

According to one embodiment of the present invention, the abutting-joint structure is in direct contact with the circuit board.

According to one embodiment of the present invention, the touch control device further comprises a gasket. The gasket is arranged, corresponding to the abutting joint structure, on the circuit board, and the abutting-joint structure is in contact with the circuit board by the gasket.

According to one embodiment of the present invention, each of the abutting-joint structures is of a hooked bend, and the bottom of the hooked bend is in contact with the circuit board.

According to one embodiment of the present invention, each of the abutting-joint structures is of an arc-shaped bend, and the bottom of the arc-shaped bend is in contact with the circuit board.

According to one embodiment of the present invention, the height of the abutting joint structure is larger than or equal to the distance from the middle region of the bracket to the circuit board.

According to one embodiment of the present invention, the width of the cantilever is uniform.

According to one embodiment of the present invention, the touch control device is provided with a pressing region, the pressing region is provided with a central region corresponding to the elastic sheet body and side regions corresponding to the cantilevers, and a rate of an absolute value of a difference between the load on the central region and the load on the side regions to the load on the central region is smaller than 1%.

According to one embodiment of the present invention, the end is a free end.

According to one embodiment of the present invention, the amplitude of the cantilever ranges from 0.2 mm to 0.5 mm.

Based on the above, the bracket of the touch control device according to the present invention comprises the two cantilevers which are located at both sides of the middle region of the second side and extend towards opposite directions. The end of each cantilever is provided with the abutting joint structure and is in contact with the circuit board by the abutting-joint structure so that the touch control device is capable of providing relatively good uniformity of pressing load.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
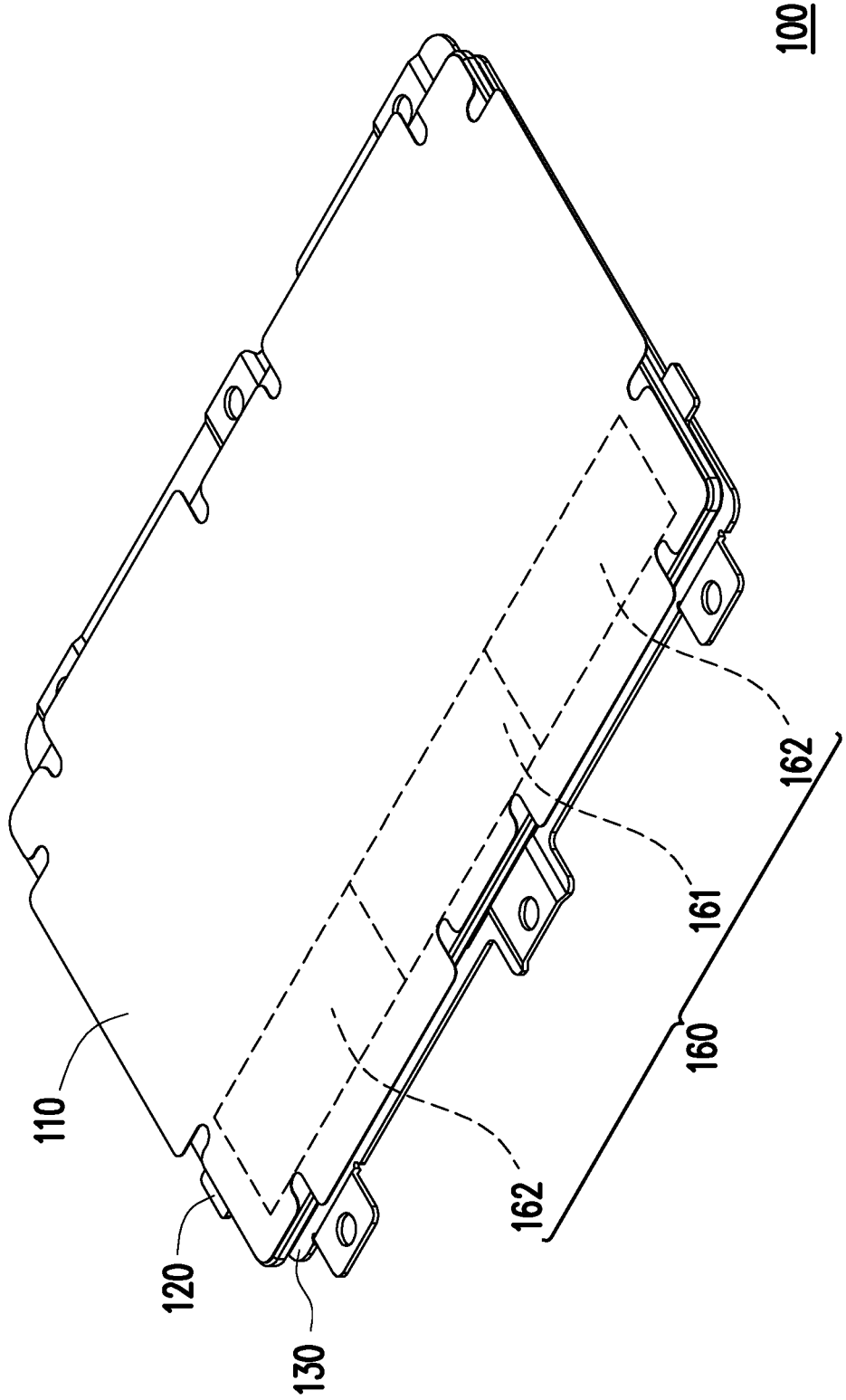
FIG. 1A is a three-dimensional schematic view of a touch control device according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
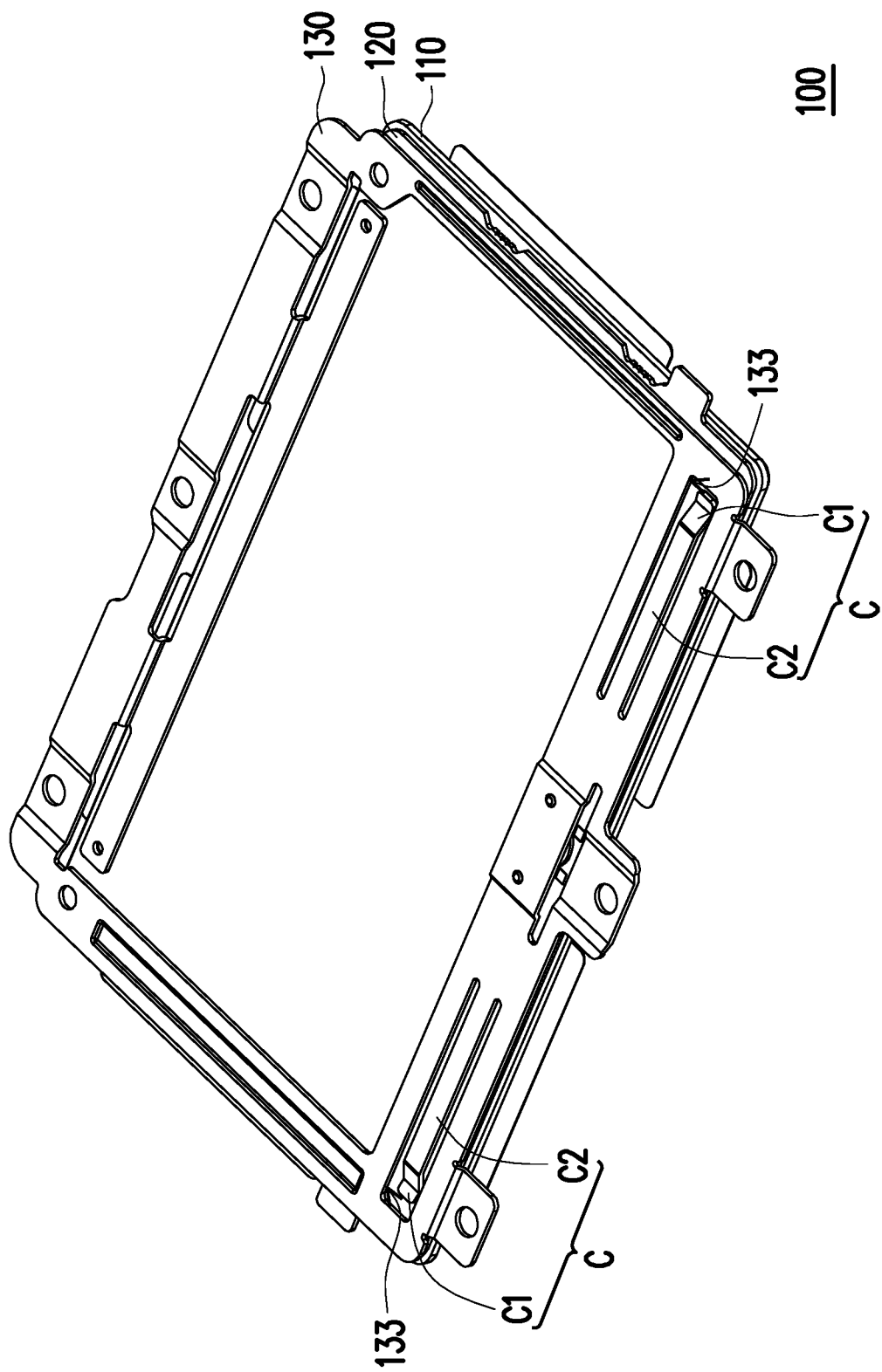
FIG. 1B is a schematic view from another viewing angle of the touch control device in FIG. 1A.
Figure 2A:
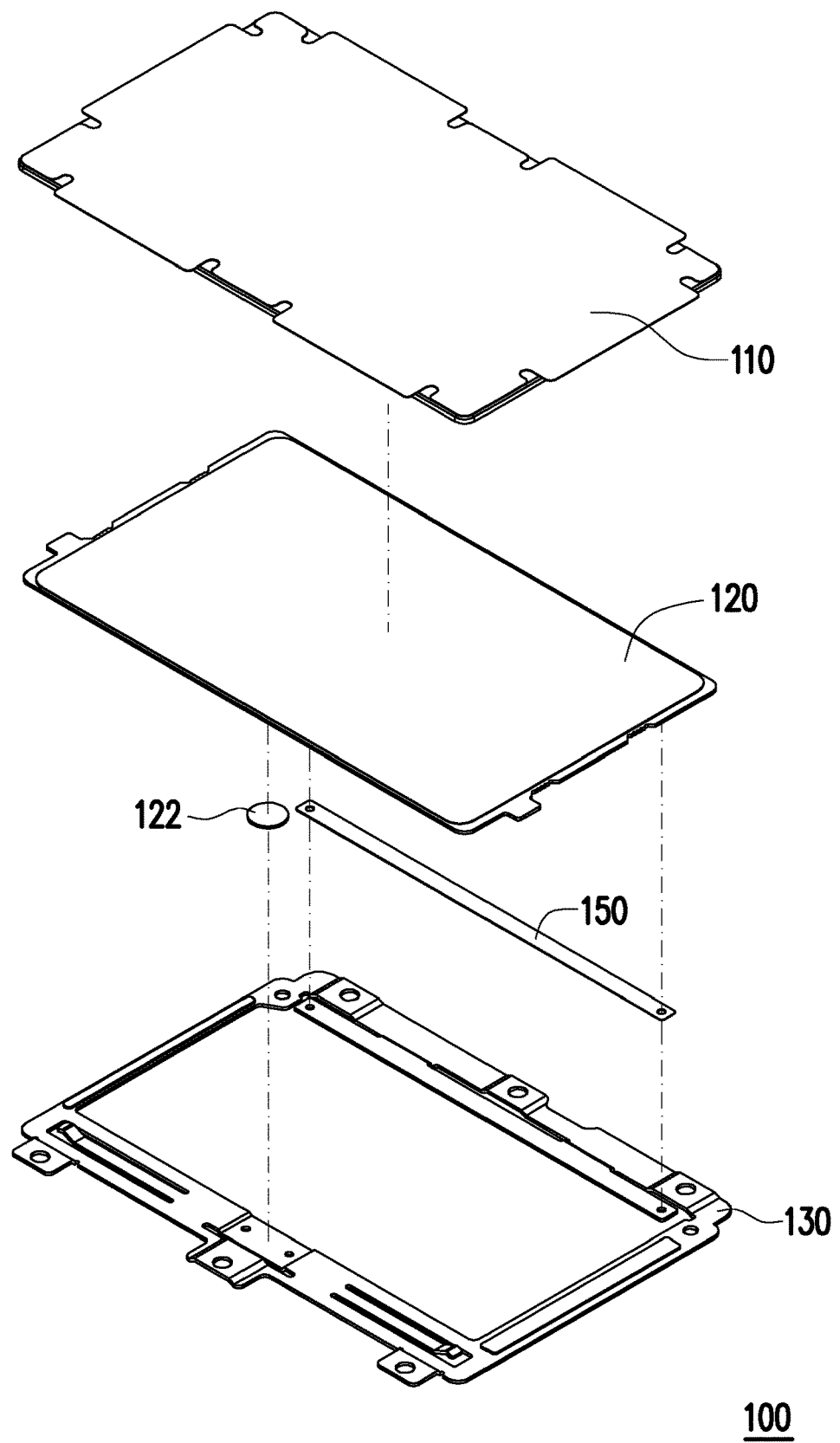
FIG. 2A is an exploded schematic view of the touch control device in FIG. 1A.
Figure 2B:
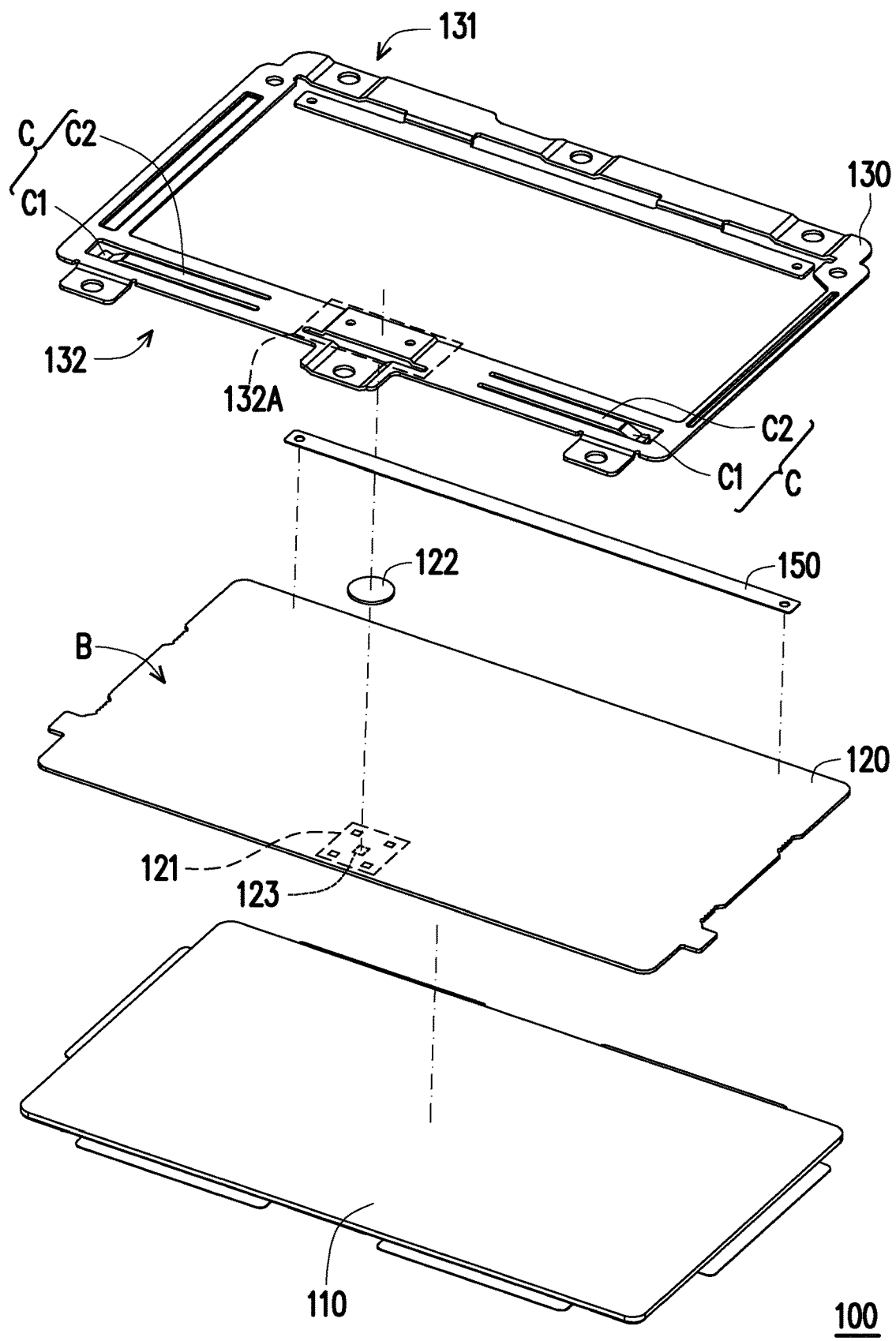
FIG. 2B is an exploded schematic view of the touch control device in FIG. 1B.

FIG. 1A is a three-dimensional schematic view of a touch control device according to one embodiment of the present invention. FIG. 1B is a schematic view from another viewing angle of the touch control device in FIG. 1A. FIG. 2A is an exploded schematic view of the touch control device in FIG. 1A. FIG. 2B is an exploded schematic view of the touch control device in FIG. 1B. Referring to FIG. 1A to FIG. 2B, the touch control device 100 in the present embodiment comprises a cover plate 110, a circuit board 120 and a bracket 130. Here, the touch control device 100 is suitable for being disposed on a notebook computer (not shown), but the touch control device 100 may also be disposed on a tablet personal computer and the like in other embodiments, it is not limited thereto. It should be noted that FIG. 1B is a viewing angle obtained by overturning the touch control device 100 in FIG. 1A up and down for 180 degrees.

Referring to FIG. 2A, the circuit board 120 is fixedly arranged below the cover plate 110 in the present embodiment. The circuit board 120 is fixedly arranged below the cover plate 110 by, for example, sticking. As shown in FIG. 2B, the circuit board 120 is provided with a triggering region 121 located on a bottom surface B, and the triggering region 121 is provided with a circuit switch 123. The bracket 130 is disposed below the circuit board 120, an elastic sheet body 122 is arranged between the bracket 130 and the circuit board 120, and the elastic sheet body 122 corresponds to the triggering region 121 and the circuit switch 123. When a user presses against the cover plate 110, the circuit switch 123 is turned on by virtue of the deformation of the elastic sheet body 122, so that the effect of triggering a button is achieved.

In the present embodiment, the elastic sheet body 122 is a metal elastic diaphragm and is shaped like a dome, but the material or form of the elastic sheet body 122 is not limited thereto in other embodiments. In the present embodiment, the bracket 130 is made of metal such as stainless steel (SUS304), but the material of the bracket 130 is not limited thereto in other embodiments.

In more detail, referring to FIG. 2B, the bracket 130 is provided with a first side 131 and a second side 132 which are opposite to each other in the present embodiment. The circuit board 120 is fixedly arranged at the first side 131 of the bracket 130 by an underlying piece 150 of the touch control device 100. The cover plate 110 is pivoted to the first side 131 of the bracket 130. In the present embodiment, the underlying piece 150 is connected to the circuit board 120 and the bracket 130 by virtue of, for example, an adhesive. However, in other embodiments, the way that the underlying piece 150 is connected to the circuit board 120 and the bracket 130 is not limited thereto.

Furthermore, in the present embodiment, the underlying piece 150 is located at the first side 131 and is used for providing a function as a fulcrum or a rotating shaft when the second side 132 is pressed, so that the second side 132 is capable of slightly rotating relative to the underlying piece 150. In the present embodiment, the underlying piece 150 is, for example, a foam adhesive tape; however, in other embodiments, the underlying piece 150 is not limited to thereto. The cover plate 110 may also be pivoted to the first side 131 of the bracket 130 by a hinge in other embodiments.

In addition, the bracket 130 in the present embodiment is provided with a middle region 132A located on the second side 132, and the elastic sheet body 122 is in contact with the middle region 132A of the bracket 130. The bracket 130 further comprises two cantilevers C which are located at both sides of the middle region 132A of the second side 132 and extend towards opposite directions. Of course, in other embodiments, the amount of the cantilevers C may be regulated according to an actual production process, and is not limited thereto.

Figure 3:
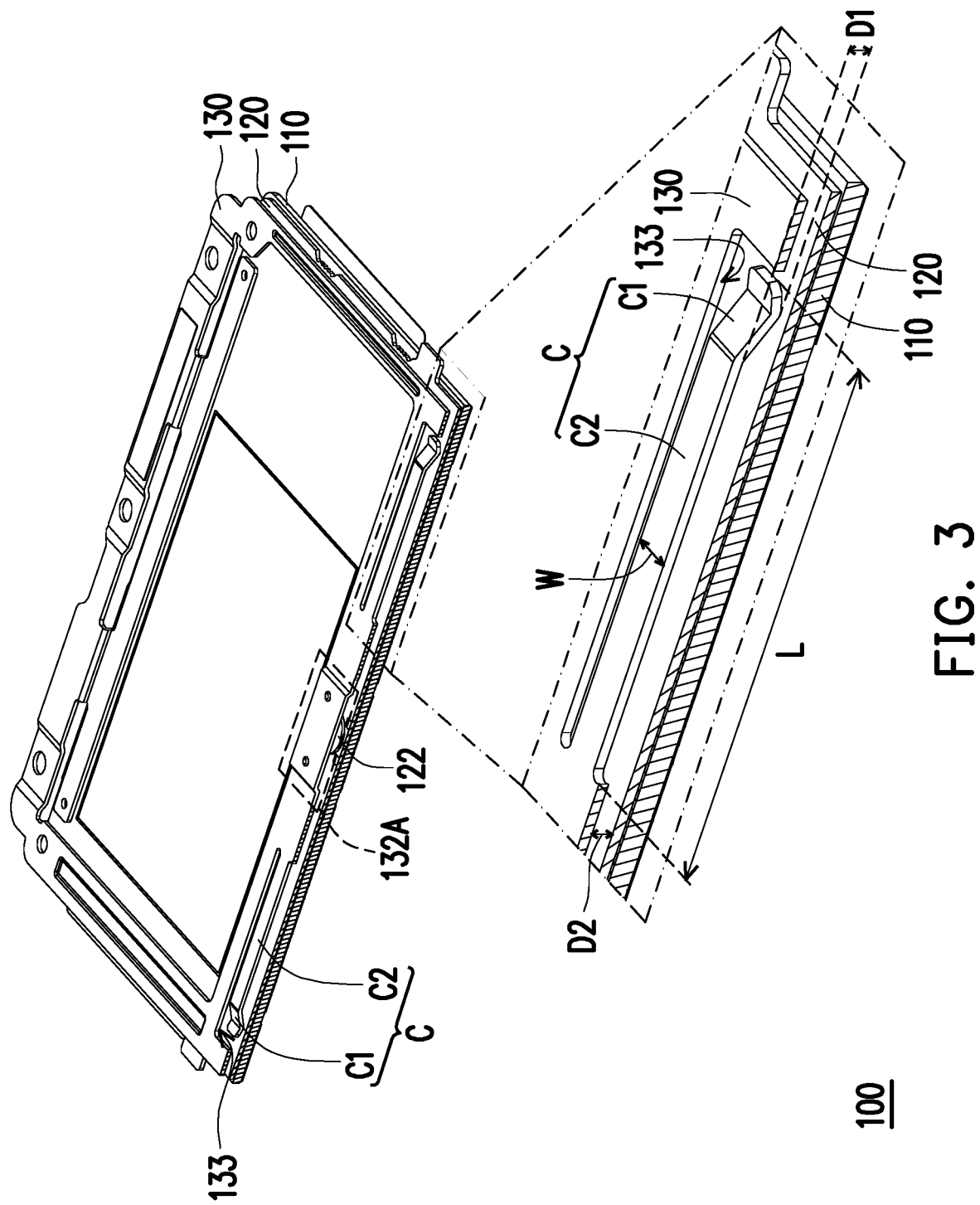
FIG. 3 is a cross-sectional three-dimensional schematic view of the touch control device in FIG. 1B.

FIG. 3 is a cross-sectional three-dimensional schematic view of the touch control device in FIG. 1B. Referring to FIG. 3, in the present embodiment, one end of each cantilever C is provided with an abutting-joint structure C1 and is in contact with the circuit board 120 by the abutting joint structure C1. The end is a free end. Each cantilever C is provided with a connecting part C2 one end of the connecting part C2 is connected to the abutting-joint structure C1, and the other end of the connecting part C2 is connected to the bracket 130. In the present embodiment, the connecting part C2 is deformable. In the present embodiment, the bracket 130 and the cantilever C are produced in an integrally molding way, and the bracket 130 is provided with breaches 133 with opposite openings at the second side 132. Seen from FIG. 2B, in the present embodiment, the breach 133 is U-shaped, but is not limited thereto. The cantilever C is defined by the breach 133.

In more detail, the production way of the cantilever C is, for example, producing the breach 133 in the bracket 130, and then, producing the bent abutting-joint structure C1 on a part (namely the cantilever C) of the bracket 130, surrounded by the breach 133. Therefore, the cantilever C is composed of a part of the bracket 130, the bracket 130 is integrated with two cantilevers C, however, in other embodiments, it is not limited thereto.

In the present embodiment, the cover plate 110 comprises a glass plate and a touch control circuit (not shown) disposed on the glass plate, however, it is not limited thereto. The user may control the movement of a cursor by virtue of the slip of a finger on the cover plate 110, the cover plate 110 presses against the elastic sheet body 122 and triggers the circuit switch 123 (FIG. 2B) by pressing the cover plate 110, so that the click function (not shown) of the cursor on a display screen of the notebook computer is controlled.

According to the touch control device 100 in the present embodiment, the cantilever C is produced by only utilizing the original bracket 130, the connecting part C2 of the cantilever is deformed, and the abutting-joint structure C1 of the cantilever C is in contact with the circuit board 120, so that a reaction force is provided for the circuit board 120 at the abutting joint structure C1 of the cantilever C, and forces for pressing a central region 161 and a side region 162 are approximate. In addition, the linkage property of a pressing region 160 between the central region 161 and the side region 162 is also improved by the cantilever C, and furthermore, the touch control device 100 is effectively made to provide relatively good uniformity of pressing load. Thus, a manufacturer does not need to additionally increase mechanisms, so that the engineering of processing required to be done by the manufacturer is omitted. The manufacturer can follow the lightening and thinning trends without additionally increasing the thickness and the like of the bracket.

In addition, according to the touch control device 100 in the present embodiment, the abutting joint structure C1 of the cantilever C is in contact with the circuit board 120, displacement between the bracket 130 and the circuit board 120 is not easy to generate even if a space exists between the bracket 130 and the circuit board 120, and furthermore, the touch control device 100 cannot skew in an assembly process, so that the effect of keeping the appearance of the assembled touch control device complete is achieved.

The way that the touch control device provides the relatively good uniformity of pressing load is described below in more detail.

Figure 4:
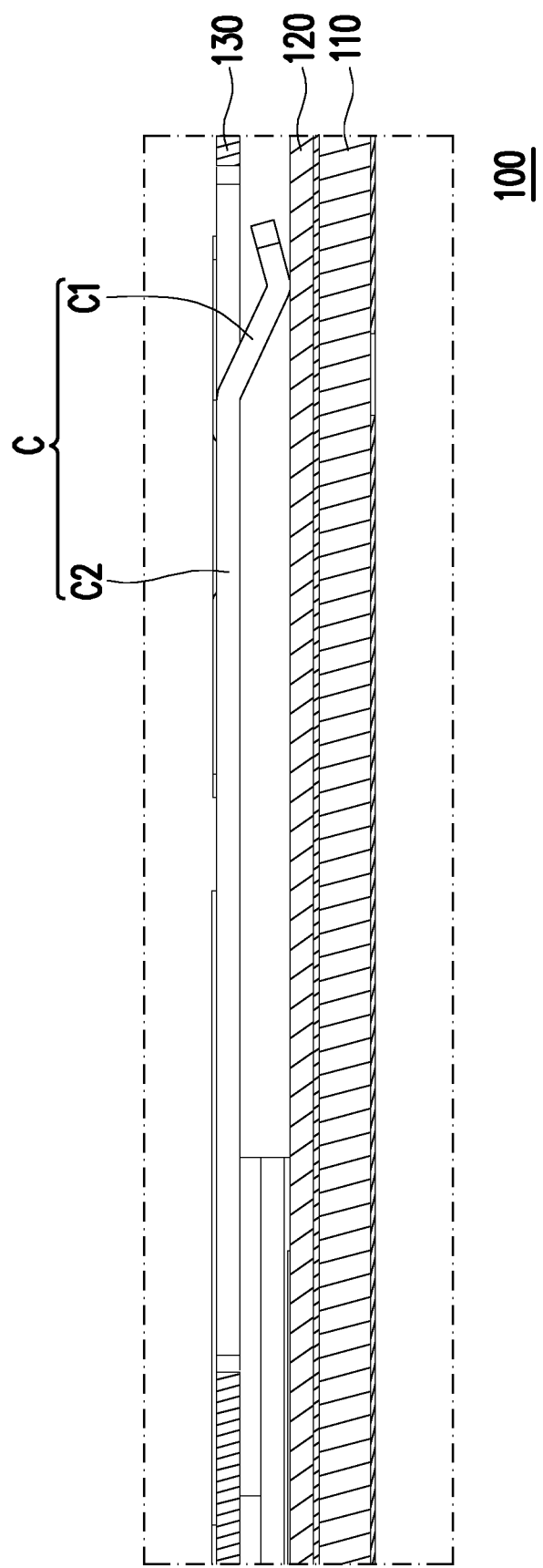
FIG. 4 is a partially enlarged cross-sectional side schematic view of the touch control device in FIG. 3.

FIG. 4 is a partially enlarged cross-sectional side schematic view of the touch control device in FIG. 3. Referring to FIG. 4, in the present embodiment, the abutting-joint structure C1 is in direct contact with the circuit board 120. In addition, the abutting joint structure C1 is of a hooked bend, such as a V shape, the bottom of the hooked bend is in contact with the circuit board 120, and the way that the abutting joint structure C1 is in contact with the circuit board 120 approach to line contact. However, in other embodiments, the way that the abutting-joint structure C1 is in contact with the circuit board 120 may also be surface contact or any other ways, and the form of the abutting-joint structure C1 and the way that the abutting-joint structure C1 is in contact with the circuit board 120 are not limited thereto.

Referring to FIG. 3, in the present embodiment, the height D1 of the abutting-joint structure C1 is equal to the distance from the middle region 132A of the bracket 130 to the circuit board 120, for example, the distance D2 from the root of the cantilever C to the circuit board 120. In other embodiments, the height D1 of the abutting-joint structure C1 is larger than the distance from the middle region 132A of the bracket 130 to the circuit board 120. Therefore, the abutting joint structure C1 is in contact with the circuit board 120 to form prepressing when the bracket 130 is combined with the circuit board 120.

In addition, as shown in FIG. 3, in the present embodiment, the width W of the cantilever C is uniform, the length L of each cantilever C ranges from 15 mm to 30 mm, and the width W of each cantilever C ranges from 2 mm to 8 mm. The amplitude of the cantilever C ranges from 0.2 mm to 0.5 mm. Such numerical ranges can make the cantilever C have enough high structural strength and have an enough high supporting force for the circuit board 120. Of course, in other embodiments, the width of the cantilever C may also be non-uniform, for example, the width of the cantilever C at the abutting-joint structure C1 is relatively large, but the size of the cantilever C is not limited thereto.

Figure 5:
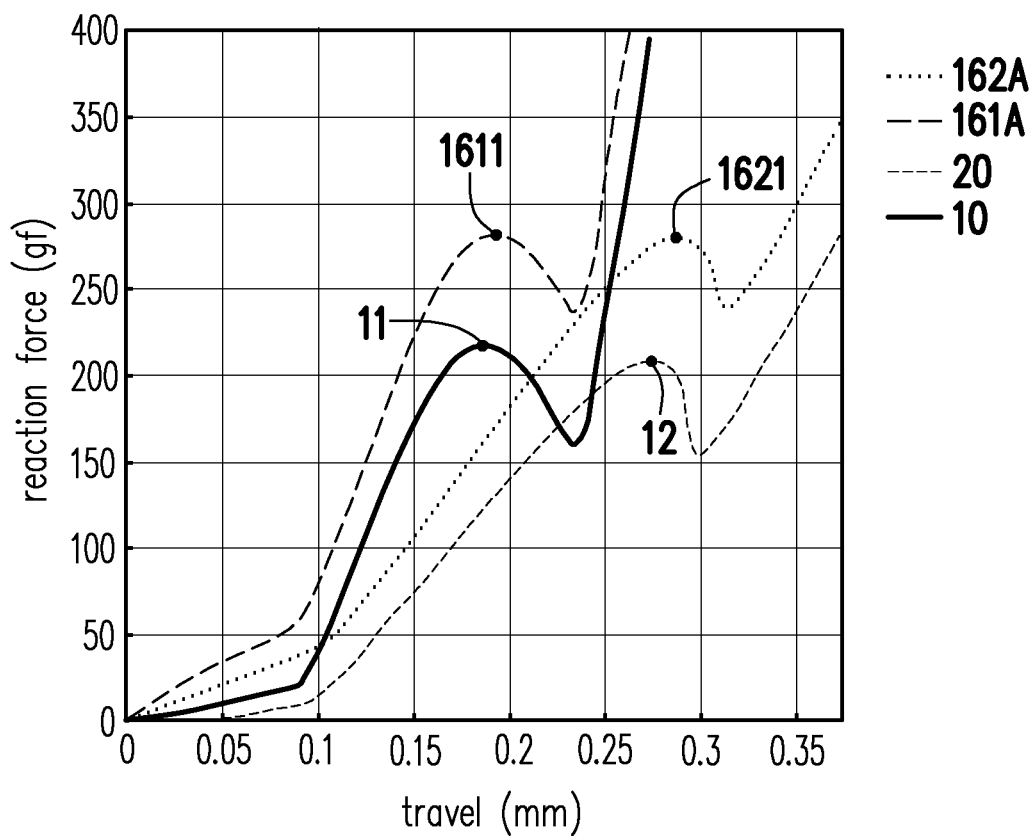
FIG. 5 is schematic view of a load on a pressing region of the touch control device in FIG. 1B.

FIG. 5 is schematic view of a load on a pressing region of the touch control device in FIG. 1B. Referring to FIG. 1A, in more detail, the touch control device 100 is provided with the pressing region 160, the pressing region 160 is provided with the central region 161 corresponding to the elastic sheet body 122 and two side regions 162 corresponding to the two cantilevers C. The two side regions 162 are located at two opposite sides of the central region 161.

Generally speaking, in a known touch control device, the cover plate is pivoted to the first side of the bracket, and therefore, the second side of the cover plate may move downwards to press against the elastic sheet body and trigger the circuit switch when the user presses against the second side of the cover plate. But since the circuit switch is located on a position corresponding to the central region, the circuit switch is in contact with or approaches to the parts, corresponding to the central region, of the cover plate and the circuit board, while there is a certain distance between the parts of the circuit board of the touch control device in the side region and the bracket 130 (i.e., the parts, corresponding to the side regions, of the cover plate and the circuit board are not directly supported), and therefore, the force required to be applied when the user presses against the side region of the known touch control device to drive the central region to move the trigger the circuit switch may be obviously different from the force generated by directly pressing the central region of the known touch control device (compared with the parts, corresponding to the central region, of the cover plate and the circuit board, the parts, corresponding to the side regions, of the cover plate and the circuit board may be relatively easy to press), resulting in poor hand feel of the user.

According to the touch control device 100 in the present embodiment, the cantilever C is produced by utilizing the original bracket 130, the connecting part C2 of the cantilever is deformed, and the abutting joint structure C1 of the cantilever C is in contact with the circuit board 120, so that the parts, corresponding to the side regions 162, of the circuit board 120 and the cover plate 110 are supported, so that the situation mentioned above is improved.

Table 1 is a numerical table of collapse points on load curves in FIG. 5. Referring to FIG. 5 and table 1, known from experiments, forces generated when the known touch control device is pressed until the elastic sheet body is deformed may correspond to the collapse points on the curves, and the difference between a load curve 10 of the known central region and a load curve 20 of the known side region during collapse (namely, a collapse point 11 and a collapse point 12 in FIG. 5) are 9 gf. Relatively, in the present embodiment, the difference between a load curve 161A of the central region 161 and a load curve 162A of the side region 162 during collapse (namely, a collapse point 1611 and a collapse point 1621 in FIG. 5) are 1 gf. That is, in the present embodiment, the rate of an absolute value of the difference between the load curve 161A of the central region 161 and the load curve 162A of the side region 162 during collapse (namely the collapse point 1611 and the collapse point 1621 in FIG. 5) to the load on the central region 161 (namely the collapse point 1611) is smaller than 1%.

Table 1, numerical table of collapse point on load curve in FIG. 5

|  | Reaction force in central region | Reaction force in side regions | Difference |
| --- | --- | --- | --- |
| Touch control device in the present embodiment | 282 gf | 281 gf | 1 gf |
| Known touch control device | 218 gf | 209 gf | 9 gf |

Therefore, compared with the known touch control device, in the present embodiment, the difference between the load on the central region 161 and the load on the side region 162 is less, so that the pressing load of the touch control device has relatively good uniformity. The central region 161 and the side region 162 may be pressed by using approximate forces when the user presses against the touch control device 100 in the present embodiment, so that the relatively good hand feel experience is achieved.

Figure 6:
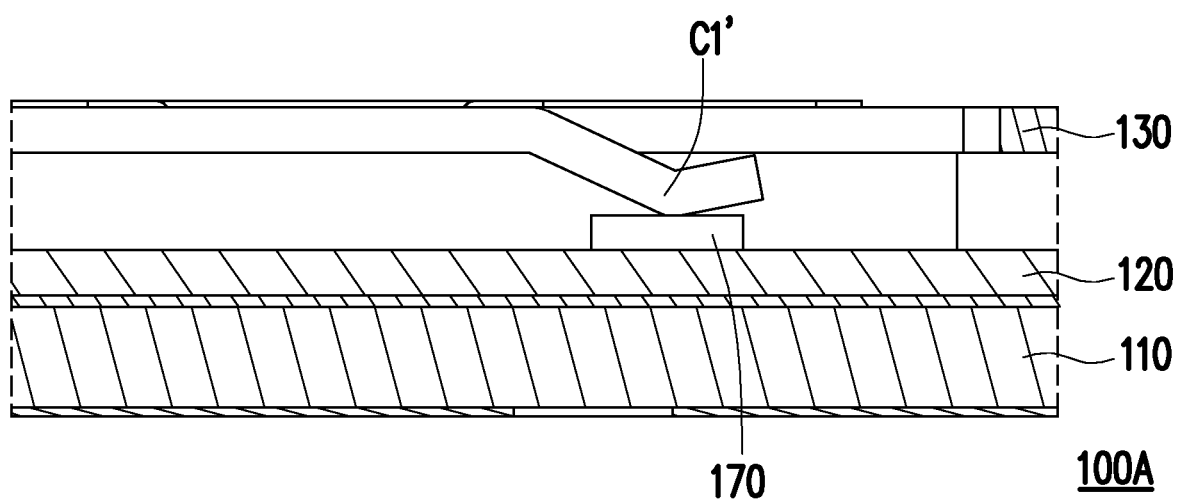
FIG. 6 and FIG. 7 are cross-sectional side schematic views of various touch control devices according to other embodiments of the present invention.
Figure 7:
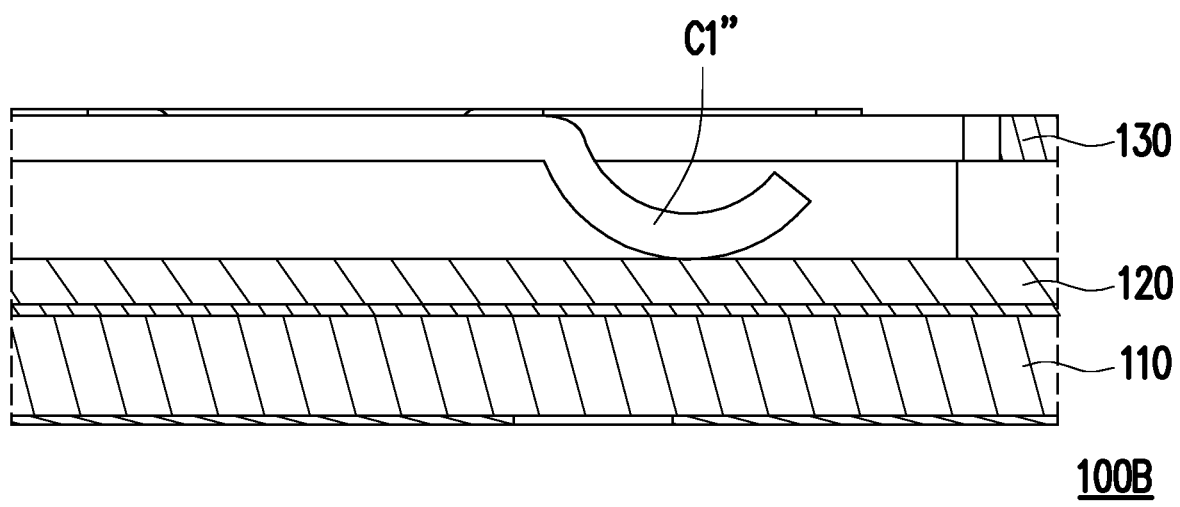

FIG. 6 and FIG. 7 are cross-sectional side schematic views of various touch control devices according to other embodiments of the present invention. Referring to FIG. 6, slightly different from the touch control device 100 in FIG. 4, the touch control device 100A in the present embodiment further comprises a gasket 170. The gasket 170 are arranged, corresponding to abutting-joint structure C1', on the circuit board 120, and the abutting joint structure C1' is in contact with the circuit board 120 by the gasket 170.

In more detail, height of the abutting joint structure C1' in the present embodiment is smaller than the height D1 of the abutting joint structure C1 in FIG. 3, and the abutting joint structure C1' cannot be in direct contact with the circuit board 120, but is in contact with the gasket 170 and then in contact with the circuit board 120 by the gasket 170. Due to the adoption of the design, the abutting joint structure can C1' have relatively high structural strength without requiring too high bending height of the abutting-joint structure C1'. In the present embodiment, the gasket 170 comprises a mylar, a foam sheet, a rubber sheet or a silicon rubber sheet, but is not limited thereto.

Referring to FIG. 7, the touch control device 100B in the present embodiment is slightly different from the touch control device 100 in FIG. 4 in that each abutting joint structure C1" in the present embodiment is of an arc-shaped bend such as a U shape, the bottom of the arc-shaped bend is in contact with the circuit board 120. In another embodiment, the bottom of the arc-shaped bend may be not in direct contact with the circuit board 120, but is in contact with the circuit board 120 by the gasket 170 in FIG. 6.

Based on the above, according to the touch control device of the present invention, the cantilever is produced by utilizing the original bracket, the connecting part of the cantilever is deformable, and the abutting-joint structure of the cantilever C is in contact with the circuit board, so that the touch control device is effectively made to provide relatively good uniformity of pressing load. Thus, a manufacturer does not need to additionally increase mechanisms, so that the engineering of processing required to be done by the manufacturer is omitted; in addition, the manufacturer can follow the lightening and thinning trends without additionally increasing the thickness and the like of the bracket.

It should be finally noted that the above embodiments are merely intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A touch control device, comprising: a cover plate; a circuit board, fixedly arranged below the cover plate, the circuit board being provided with a triggering region located on a bottom surface; an elastic sheet body, arranged under the circuit board and corresponding to the triggering region; and a bracket, disposed below the circuit board, the bracket being provided with a first side and a second side which are opposite to each other and a middle region located on the second side and further comprising two cantilevers which are located at both sides of the middle region of the second side and extend towards opposite directions, the elastic sheet body being in contact with the middle region, and an end of each of the cantilevers being provided with an abutting-joint structure and being in contact with the circuit board by the abutting-joint structure; wherein a height of the abutting-joint structure is larger than or equal to a distance from the middle region of the bracket to the circuit board.

2. The touch control device according to claim 1, wherein the abutting-joint structure is in direct contact with the circuit board.

3. The touch control device according to claim 1, further comprising a gasket arranged, corresponding to the abutting joint structure, on the circuit board, and the abutting joint structure being in contact with the circuit board by the gasket.

4. The touch control device according to claim 3, wherein the gasket comprises a mylar, a foam sheet, a rubber sheet or a silicon rubber sheet.

5. The touch control device according to claim 1, wherein the abutting-joint structure is of a hooked bend, and the bottom of the hooked bend is in contact with the circuit board.

6. The touch control device according to claim 1, wherein the abutting-joint structure is of an arc-shaped bend, and the bottom of the arc-shaped bend is in contact with the circuit board.

7. The touch control device according to claim 1, wherein the bracket is provided with breaches with opposite openings at the second side, and the cantilevers are defined by the breaches.

8. The touch control device according to claim 1, wherein the circuit board is fixedly arranged at the first side of the bracket by an underlying piece.

9. The touch control device according to claim 1, wherein the cover plate is pivoted to the first side of the bracket.

10. The touch control device according to claim 1, wherein a width of the cantilever is uniform.

11. The touch control device according to claim 1, wherein a length of each of the cantilevers ranges from 15 mm to 30 mm, and a width of each of the cantilevers ranges from 2 mm to 8 mm.

12. The touch control device according to claim 1, wherein the touch control device is provided with a pressing region, wherein the pressing region is provided with a central region corresponding to the elastic sheet body and side regions corresponding to the cantilevers, and a rate of an absolute value of a difference between a load on the central region and a load on the side regions to the load on the central region is smaller than 1%.

13. The touch control device according to claim 1, wherein the bracket is integrated with the two cantilevers.

14. The touch control device according to claim 1, wherein the end is a free end.

15. The touch control device according to claim 1, wherein the elastic sheet body is a metal elastic diaphragm.

16. The touch control device according to claim 1, wherein the elastic sheet body is shaped as a dome.

17. The touch control device according to claim 1, wherein the circuit board is provided with a circuit switch located in the triggering region.

18. The touch control device according to claim 1, wherein the bracket is made of metal.

19. The touch control device according to claim 1, wherein an amplitude of the cantilever ranges from 0.2 mm to 0.5 mm.

* * * * *